United States Patent
Woerner

(10) Patent No.: US 10,542,681 B1
(45) Date of Patent: Jan. 28, 2020

(54) STEAM TREATMENT OF SOIL

(71) Applicant: Edward E. Woerner, Elberta, AL (US)

(72) Inventor: Edward E. Woerner, Elberta, AL (US)

(\*) Notice: Subject to any disclaimer, the term of this patent is extended or adjusted under 35 U.S.C. 154(b) by 0 days.

(21) Appl. No.: 16/408,685

(22) Filed: May 10, 2019

Related U.S. Application Data

(63) Continuation of application No. 16/381,594, filed on Apr. 11, 2019, which is a continuation-in-part of application No. 15/670,303, filed on Aug. 7, 2017.

(60) Provisional application No. 62/371,929, filed on Aug. 8, 2016.

(51) Int. Cl.
*A01G 11/00* (2006.01)
*B09C 1/06* (2006.01)

(52) U.S. Cl.
CPC ............. *A01G 11/00* (2013.01); *B09C 1/06* (2013.01); *B09C 2101/00* (2013.01)

(58) Field of Classification Search
CPC ........ A01G 11/00; B09C 1/06; B09C 2101/00
See application file for complete search history.

(56) References Cited

U.S. PATENT DOCUMENTS

| | | | |
|---|---|---|---|
| 4,666,337 A | 5/1987 | Pinto | |
| 5,430,970 A | 7/1995 | Thompson et al. | |
| 5,433,758 A | 7/1995 | Thompson et al. | |
| 5,526,759 A | 6/1996 | Cox | |
| 5,622,123 A | 4/1997 | Rajamannan | |
| 5,674,424 A | 10/1997 | Iben et al. | |
| 6,183,532 B1 | 2/2001 | Celli | |
| 6,319,463 B1 | 11/2001 | Celli | |
| 6,543,963 B2 | 4/2003 | Bruso | |
| 6,663,324 B2 | 12/2003 | Nordloh | |
| 6,779,948 B2 | 8/2004 | Bruso | |
| 7,018,135 B2 * | 3/2006 | Kaul | A01G 13/0287 405/129.75 |
| RE39,636 E | 5/2007 | Brown | |
| 7,824,133 B1 * | 11/2010 | Lazaro | B09B 1/002 405/302.7 |
| 8,435,459 B2 | 5/2013 | Reddy et al. | |
| 8,652,403 B2 | 2/2014 | Reddy et al. | |

(Continued)

FOREIGN PATENT DOCUMENTS

| | | |
|---|---|---|
| CA | 2236741 A1 | 12/1999 |
| CN | 201182064 | 1/2009 |

(Continued)

*Primary Examiner* — Benjamin F Fiorello
(74) *Attorney, Agent, or Firm* — Luedeka Neely Group, PC

(57) ABSTRACT

A soil treatment system, including heat treatment apparatus configured to travel in a forward direction along a plot of ground having a soil surface and configured for disturbing the soil surface and treating associated soil with steam as the heat treatment apparatus travels to provide steam treated soil, and a source of steam in flow communication with the heat treatment apparatus for supplying steam to the heat treatment apparatus. The heat treatment apparatus includes a blade configured to contact the soil surface and lift and circulate the soil and return the soil to the ground and a plurality of steam outlets configured to introduce steam to the soil as it is lifted and circulated. The system also includes an insulative sheet material and a cooperating dispenser configured to dispense the sheet material to overlie the treated soil with the sheet material after the passage of the heat treatment apparatus.

3 Claims, 4 Drawing Sheets

(56) References Cited

U.S. PATENT DOCUMENTS

| | | |
|---|---|---|
| 2003/0147774 A1 | 8/2003 | Celli |
| 2005/0022983 A1 | 2/2005 | Kadle et al. |
| 2005/0223638 A1 | 10/2005 | Moren |
| 2006/0283364 A1 | 12/2006 | Taniwaki et al. |
| 2011/0064523 A1 | 3/2011 | Asaoka et al. |
| 2011/0162435 A1 | 7/2011 | Stedman |

FOREIGN PATENT DOCUMENTS

| | | |
|---|---|---|
| CN | 103299978 A | 9/2013 |
| CN | 103329883 A | 10/2013 |
| DE | 102010045286 A1 | 3/2012 |
| WO | 2005022983 A1 | 3/2005 |
| WO | 2011162435 A1 | 12/2011 |

\* cited by examiner

STEAM TREATMENT OF SOIL

CROSS-REFERENCE TO RELATED APPLICATION

This application is a continuation of co-pending U.S. application Ser. No. 15/670,303 filed Aug. 7, 2017, entitled STEAM TREATMENT OF SOIL, incorporated herein by reference in its entirety.

FIELD

This disclosure relates to the treatment of soil using steam. More particularly, this disclosure relates to mobile apparatus for treatment of soil onsite using steam.

BACKGROUND

Improvement is desired in the treatment of soil using steam. Treatment of soil with steam is a technique intended to sterilize the soil. It has been observed that steam will kill pests of plant cultures such as weeds, bacteria, fungi and viruses. Steam can also be used to treat soil fatigue. Conventional treatment methods and apparatus either do not effectively treat the soil, or cannot do so in a cost-effective manner.

In treating soil with steam, it is desired to effectively treat the soil to achieve benefits, such as killing soil-borne diseases and pathogens, the thermal destruction of seeds in the top layer of the treated soil, such as the seeds of weeds, and treating soil fatigue. In many cases, even if the soil is initially heated by the steam to an effective level, heat escapes rapidly from the top layer and a myriad of new growth from seeds of weeds and the like in the soil appears.

What is desired is apparatus that may be utilized to treat soil with steam onsite and in a manner that effectively not only treats the soil to kill pathogens and treat soil fatigue, but also effectively destroys the viability of weed seeds and the like in the top layer of the treated soil.

SUMMARY

The above and other needs are met by soil treatment systems.

In one aspect, the system includes heat treatment apparatus configured to travel in a forward direction along a plot of ground having a soil surface and configured for disturbing the soil surface and treating associated soil with steam as the heat treatment apparatus travels to provide steam treated soil, and a source of steam in flow communication with the heat treatment apparatus for supplying steam to the heat treatment apparatus.

The heat treatment apparatus includes a plurality of rotating blades configured to contact the soil surface and lift and circulate the soil and return the soil to the ground; a plurality of soil knives located forward of the rotating blades and configured to extend below the ground; a plurality of soil tines located rearward of the rotating blades: a front steam manifold located in front of the rotating blades, and behind the soil knives, at a vertical location just slightly above the soil surface, the front steam manifold including a plurality of front steam outlets; a mid steam manifold located above a mid-portion of the rotating blades, the mid steam manifold including a plurality of mid steam outlets; a rear steam manifold located rearward of the rotating blades, the rear steam manifold including a plurality of rear steam outlets; and a heat shield located to substantially envelop the rotating blades, the front steam outlets, the mid steam outlets, and the rear steam outlets.

The system also includes an insulative sheet material and a cooperating dispenser configured to dispense the sheet material to overlie the treated soil with the sheet material after the passage of the heat treatment apparatus.

In another aspect, the system includes heat treatment apparatus configured to travel in a forward direction along a plot of ground having a soil surface and configured for disturbing the soil surface and treating associated soil with steam as the heat treatment apparatus travels to provide steam treated soil, and a source of steam in flow communication with the heat treatment apparatus for supplying steam to the heat treatment apparatus.

The heat treatment apparatus includes a blade configured to contact the soil surface and lift and circulate the soil and return the soil to the ground; a front steam manifold located in front of the blade at a vertical location just slightly above the soil surface, the front steam manifold including a front steam outlet; a mid steam manifold located above a mid-portion of the blade, the mid steam manifold including a mid steam outlet; a rear steam manifold located rearward of the blade, the rear steam manifold including a rear steam outlet; and a heat shield located to substantially envelop the blade, the front steam outlet, the mid steam outlet, and the rear steam outlet.

The system also includes an insulative sheet material and a cooperating dispenser configured to dispense the sheet material to overlie the treated soil with the sheet material after the passage of the heat treatment apparatus.

In a further aspect, the apparatus includes heat treatment apparatus configured to travel in a forward direction along a plot of ground having a soil surface and configured for disturbing the soil surface and treating associated soil with steam as the heat treatment apparatus travels to provide steam treated soil, and a source of steam in flow communication with the heat treatment apparatus for supplying steam to the heat treatment apparatus.

The heat treatment apparatus includes a blade configured to contact the soil surface and lift and circulate the soil and return the soil to the ground and a plurality of steam outlets configured to introduce steam to the soil as it is lifted and circulated.

The system also includes an insulative sheet material and a cooperating dispenser configured to dispense the sheet material to overlie the treated soil with the sheet material after the passage of the heat treatment apparatus.

In another aspect, the disclosure provides a method for heat treating soil.

The method includes the steps of traveling along a plot of ground having a soil surface and disturbing the soil surface and treating associated soil with heat; and covering the treated soil with an insulative sheet material for a period of time sufficient to effectively destroy the viability of weed and other plant seeds in a top layer of the treated soil.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
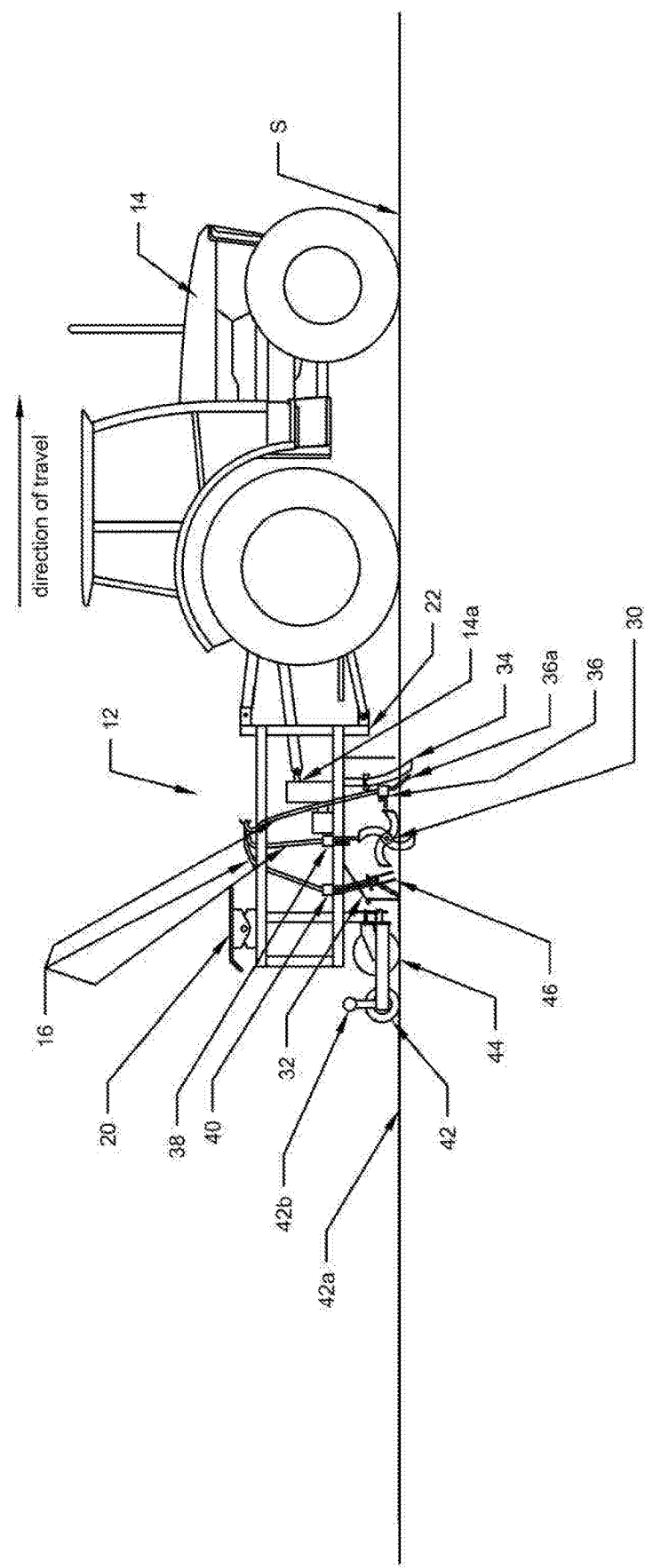
FIG. 1 shows apparatus for treatment of soil using steam according to the disclosure.

With reference to the drawings, the disclosure relates to a mobile apparatus for in-situ treatment of soil using steam. In a preferred embodiment, a steam treatment system 10 includes soil treatment apparatus 12 mounted to or pulled by a tractor 14 or other suitable all-terrain vehicle that travels along soil S to be treated. Steam supply lines 16 supply steam from a source of steam 18 to the soil treatment apparatus 12. The source of steam 18 may connect to the soil treatment apparatus 12 as by a hitch 20 or the like connector.

As depicted, the steam treatment system 10 is configured for agricultural settings, with acres of soil to treat. For example, in such a setting, a plot of ground when planted will have a plurality of generally parallel rows of crops. To treat the soil prior to planting crops, the apparatus is configured to treat portions of the soil in row sized increments. It will be appreciated that the system 10 may be otherwise sized for different treatment settings, including smaller and larger settings.

The soil treatment apparatus 12 includes a frame 22 onto which is mounted the components of the apparatus 12. The components include rotatable tiller blades 30, heat shield 32, soil knives 34, front steam supply manifolds 36, mid steam supply manifolds 38, and rear steam supply manifolds 40. In addition, the soil treatment apparatus 12 may include a roll 42 of flexible soil sheet material 42a, and a soil packer 44. In addition, the apparatus 12 includes fixed soil or clod tines 46 behind the tiller blades 30.

The rotatable tiller blades 30 are conventional roto-tiller blades coupled in a conventional manner to a PTO or power-take-off 14a of the tractor 14, or otherwise powered for rotation. As shown, the blades 30 are mounted on a rotating shaft 30a. The blades 30 preferably rotate counterclockwise as shown by the arrows in FIG. 2, so as to provide a reverse rotation to disturb the soil S and cause disturbed soil, which is elevated and tossed over the blades 30 toward the rear of the apparatus 12 as depicted in FIG. 2.

Figure 2:
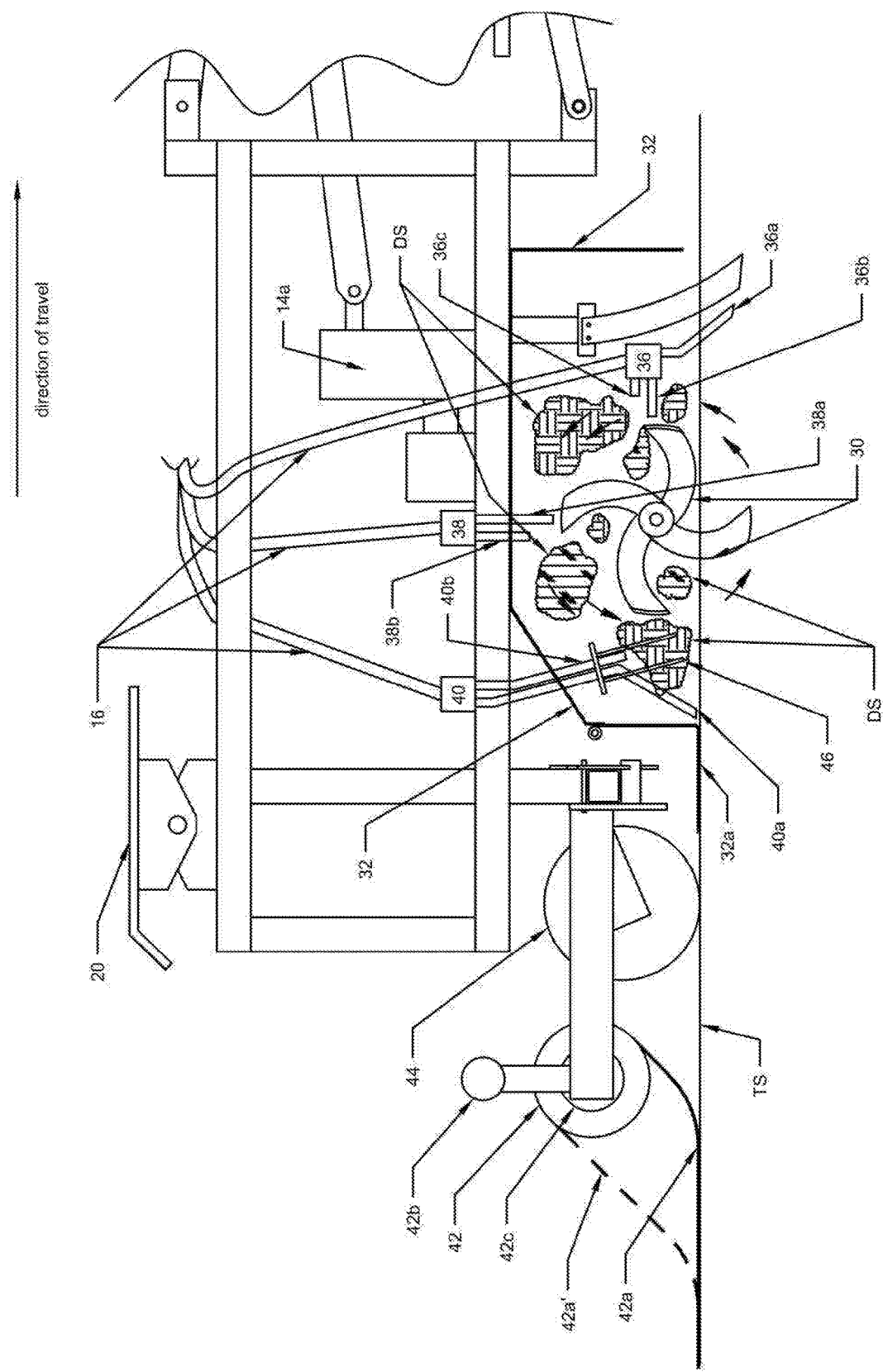
FIG. 2 is an enlarged view of portions of the apparatus of FIG. 1.
Figure 3:
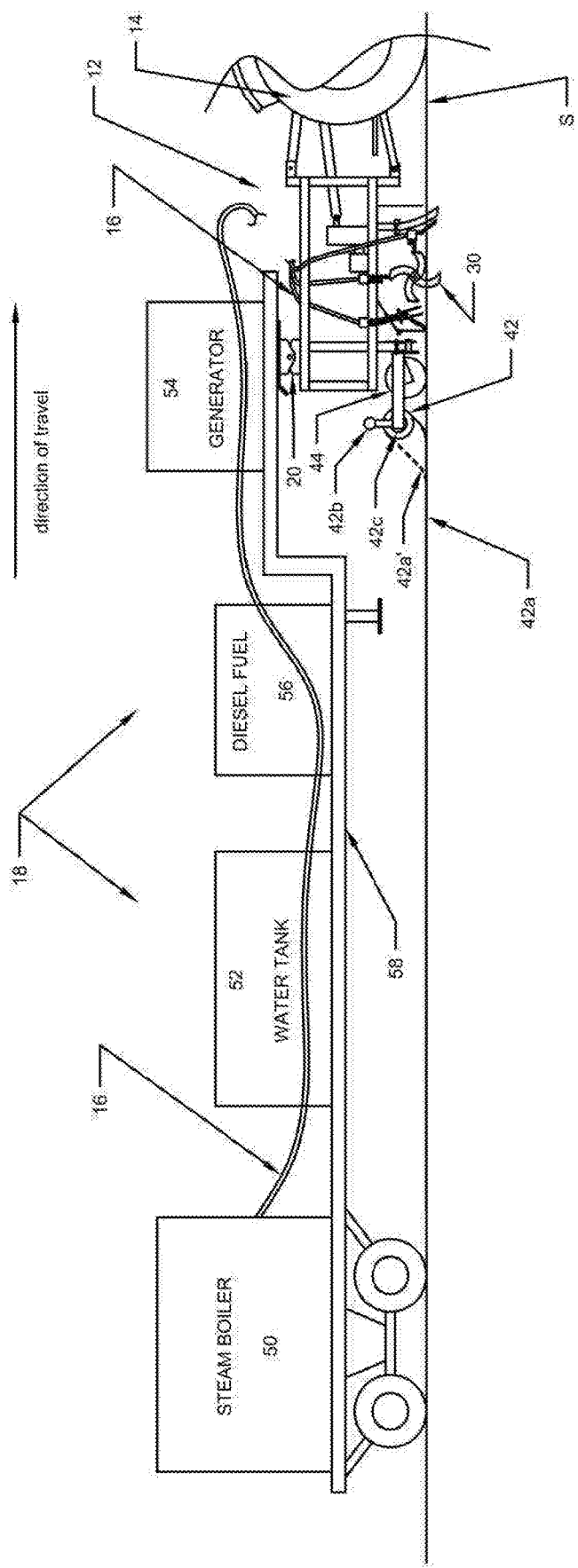
FIG. 3 shows additional components for use with a system for treatment of soil using steam according to the disclosure.

As shown, the disturbed soil and steam from the manifolds 36-40 mix thoroughly, resulting in a mixture of disturbed soil and steam represented generally by reference character DS in FIG. 2. Treated soil is depicted by reference character TS. The clod tines 46 are fixed fork-like structures upon which the disturbed soil impinges to break the soil into smaller portions. For example, the tines 46 may be provided as by a plate 46a having descending spikes 46b. The tines 46 also serve to direct larger portions and organic tillage matter, such as plant stalks and the like, downward and back into the soil as is desired in the tilling of soil.

The heat shield 32 may be of metal plate construction and located and configured around the tiller blades 30 to provide a housing or shroud for containing heat and the disturbed soil during treatment of the soil S using the soil treatment apparatus 10. The heat shield 32 includes an extension 32a configured to drag along the soil S at the rear behind the rear steam supply manifold 40 and settle the treated soil and retain heat in the upper portion of the treated soil, as explained more fully below. A trailing portion of the shield 32 from which the extension 32a extends is preferably connected as by a hinge 32b so that the trailing portion can pivot and maintain the extension 32a along the surface of the soil S. The connection provided by the hinge 32b also serves to reduce wear and tear on the heat shield 32.

The soil knives 34 are conventional agricultural soil knives of the type used to drag through soil to break up the soil. The soil knives 34 are desirably located in front of the tiller blades 30 to loosen the soil S to facilitate disturbance of the soil S in a desired manner by the tiller blades 30 to provide the disturbed soil. The soil knives 34 are desirably located within a front portion of the enclosed area of the heat shield 32.

Figure 4:
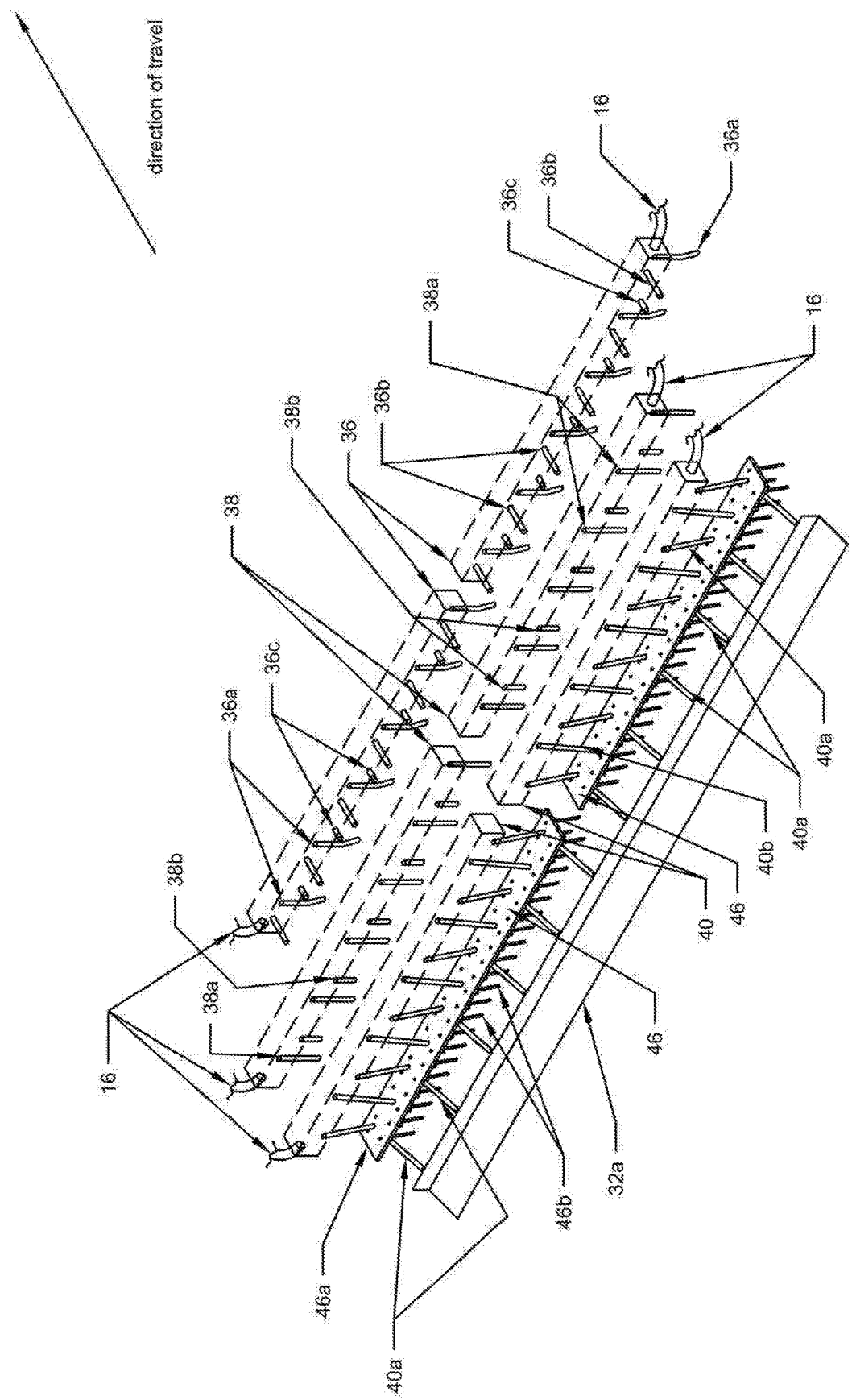
FIG. 4 shows steam supply manifolds arranged in according to the disclosure.

The steam supply manifolds 36, 38 and 40 are in flow communication with the steam supply lines 16 and located within the shroud provided by the heat shield 32. As seen in FIG. 4, each of the manifolds 36-38 are elongate and extend horizontally perpendicular to the direction of travel so as to be aligned with the width of the tiller blades 30. To facilitate application of steam pressure sufficient to avoid plugging of the manifolds from soil, debris and the like, a pair of each of the manifolds 36-40 is provided to span the width of the soil treatment apparatus 12, with each of the manifolds 36-40 connected to one of the steam supply lines 16. In a preferred embodiment, for agriculture settings, dry steam is supplied to the manifolds 36-40 at a temperature of from about 360 to about 425 degrees F., and at a pressure of from about 100 to about 150 psi.

With reference to FIG. 2, each front steam manifold 36 is located at the front of the tiller blades 30, and behind the knives 34, at a vertical location just slightly above the Soil S. The front steam manifold 36 includes steam outlet tubes 36a, 36b, and 36c.

The outlet tubes 36a are vertically directed and located directly behind the soil knives 34 and have a length configured to terminate proximate a lower end of the knife 34, which is below the soil level S. The outlet tubes 36b are horizontally directed and have a length configured to terminate about one inch from the ends of the tiller blades 30. The outlet tubes 36c are parallel to the outlet tubes 36b, but shorter, and terminate about 6 inches from the tiller blades 30. With reference to FIG. 4, the tubes 36a, 36b, and 36c, are spaced apart on about 12-inch centers and the tubes 36a, 36b, and 36c are staggered relative to one another so that, the tubes 36a are about 4 inches horizontally spaced from the adjacent tubes 36b and the tubes 36c are about 8 inches horizontally spaced from the adjacent tubes 36a, and about 4 inches horizontally spaced from the adjacent tubes 36b.

Returning to FIG. 2, the mid steam supply manifold 38 is located above a mid-portion of the tiller blades 30, proximate the center of shaft 30a onto which the blades 30 are mounted. The mid steam supply manifold 38 includes steam outlet tubes 38a and 38b, both of which extend through an upper portion of the shield 32. The tubes 38a are horizontally directed and have a length configured to terminate about one inch from the ends of the tiller blades 30. The outlet tubes 38b are parallel to the outlet tubes 36a, but shorter, and terminate about 6 inches from the tiller blades 30. With reference to FIG. 4, the tubes 38a and 38b as sets, with each set spaced apart on about 12-inch centers. The tubes 38a and 38b are parallel and aligned, spaced apart by about 2 inches from one another in each set.

With further reference to FIG. 2, the rear steam supply manifold 40 is located rearward of the tiller blades 30 and includes steam outlet tubes 40a and 40b, which extend through the shield 32 to dispose the ends of the tubes 40a just inside the rear of the shield 32 near the soil level, and the tubes 40b proximate the clod times 46. With reference to FIG. 4, the tubes 40a and 40b, are spaced apart on about 12-inch centers.

As will be appreciated, the configuration and location of the manifolds 36-40 and their associated outlet tubes relative to the tiller blades 30 enables treatment of soil using steam, and enables steam to be applied close to small soil particles. The apparatus also enables soils to be in suspense with steam for sufficient time with the steam for sterilization of the soil by the steam.

As will also be seen, such as in FIG. 2, the heat shield 32 substantially envelops the tiller blades 30, the front steam outlets 36a-36c, the mid steam supply outlets 38a and 38b, and the rear steam supply outlets 40a-40b so as to reduce the escape of heat during treatment of the soil with the steam from the steam supply outlets. In addition, as explained more fully below, the shield extension 32a and the sheet material 42a further serve to forestall the escape of heat from soil during treatment, which enhances the heat treatment of the soil.

The sheet material 42a is desirably a flexible sheet thermal insulation material having sufficient durability to withstand the rigors of the agricultural setting. For the purpose of example, the sheet material 42b may be a rubber sheet material having a thickness of about ¼ inch, with a width of from about 6 feet to about 12 feet, and a length of from about 50 to about 100 yards.

The sheet material 42a is dispensed from the roll 42 by rotation generated by a drive motor 42b associated with the roll 42. The roll 42 desirably provides the sheet material 42a in a width and length sufficient to overlie the whole of a row of soil treated. The drive motor 42b may be electronically linked to the speed of the tractor 14 to facilitate desired deployment of the sheet material 42a to overlie the treated soil. Desirably, after a pass of the treatment system 10 has been made along a length of soil to be treated, such as the length of a row in an agricultural field, it is desirable to let the sheet material 42a lie over the treated soil for a time sufficient to effectively sterilize the treated soil, including the killing of weed seeds and the like in the top layer of the treated soil. In this regard, a significant aspect of the disclosure relates to the combination of the outlet tubes 40a in combination with the shield extension 32a and the sheet material 42a.

For example, as the treated soil returns to rest after the tiller blades 30 have passed, the shield extension 32a serves to smooth the treated soil and to retain heat from escaping from the treated soil. The soil packer 44 also assists to pack and level the soil prior to installation of the sheet material 42a. In this regard, it has been observed that packing the soil also helps to retain heat in the soil. The sheet material 42a is deposited over the treated soil as a layer of insulation to retain heat in the treated soil, and especially the upper layer of the treated soil. It has been discovered that the retention of heat provided by this manner of treatment serves to enhance the treatment of the soil to not only treat the soil to kill pathogens, but to also effectively destroy the viability of weed seeds and the like in the top layer of the treated soil.

For the purpose of example, once the tractor 14 has reached the end of a row of soil to be treated, it is preferred to let the sheet material 42a lie for a time of at least about 3 minutes or more to effectively treat the soil. Then, after sufficient passage of time for treatment, the distal end of the sheet material 42 is retrieved and positioned on a tube 42c associated with the roll 42 and the drive motor 42b is reversed to retrieve the sheet material 42a to again provide the roll 42 of the sheet material 42a so that the next row of soil may be treated. Retrieval of the sheet material 42 is depicted by reference numeral 42a'. The system 10 is then ready to treat another row of soil.

The source of steam 18 may include a steam boiler 50, water tank 52, an electrical power generator 54, and fuel 56 for the generator 54, all located on a trailer 58 connected to the soil treatment apparatus 12 by the hitch 22.

As will be appreciated, apparatus according to the disclosure enables treatment of soil using steam, and enables steam to be applied close to small soil particles. The apparatus also enables soils to be in suspense with steam for sufficient time with the steam for sterilization of the soil by the steam. Further, the system enables sufficient heat retention of the treated soil to enhance treatment of the soil to kill pathogens in the soil and to also effectively destroy the viability of weed seeds and the like in the top layer of the treated soil.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A soil treatment system, comprising:
   heat treatment apparatus configured to travel in a forward direction along a plot of ground having a soil surface and configured for disturbing the soil surface and treating associated soil with steam as the heat treatment apparatus travels to provide steam treated soil, and a source of steam in flow communication with the heat treatment apparatus for supplying steam to the heat treatment apparatus, the heat treatment apparatus comprising:
   a blade configured to contact the soil surface and lift and circulate the soil and return the soil to the ground;
   a plurality of steam outlets configured to introduce steam to the soil as it is lifted and circulated;
   an insulative sheet material and a cooperating dispenser configured to dispense the sheet material to overlie the treated soil with the sheet material after the passage of the heat treatment apparatus; and
   a retriever for retrieving the dispensed sheet material after the soil has been effectively treated, the retriever configured for rendering the sheet material in a condition to be dispensed again to overlie soil treated with the heat treatment apparatus.

2. The soil treatment system of claim 1, wherein the source of steam comprises a steam boiler, a water tank, and an electrical power generator.

3. The soil treatment system of claim 1, wherein the rotating blades are provided by a rotary tiller apparatus.

* * * * *